(12) United States Patent
Ueyama

(10) Patent No.: US 6,787,955 B1
(45) Date of Patent: *Sep. 7, 2004

(54) CONTROLLABLE MAGNETIC BEARING APPARATUS AND METHOD FOR DETERMINING A MACHINE TYPE OF A MAGNETIC BEARING

(75) Inventor: Hirochika Ueyama, Hirakata (JP)

(73) Assignee: Koyo Seiko Co., Ltd., Osaka (JP)

( * ) Notice: Subject to any disclaimer, the term of this patent is extended or adjusted under 35 U.S.C. 154(b) by 189 days.

This patent is subject to a terminal disclaimer.

(21) Appl. No.: 09/786,321
(22) PCT Filed: Jul. 14, 2000
(86) PCT No.: PCT/JP00/04781
§ 371 (c)(1),
(2), (4) Date: Mar. 2, 2001
(87) PCT Pub. No.: WO01/06139
PCT Pub. Date: Jan. 25, 2001

(30) Foreign Application Priority Data

Jul. 14, 1999 (JP) .......................................... 11-200475

(51) Int. Cl.[7] .............................................. H02K 7/09
(52) U.S. Cl. .................................................... 310/90.5
(58) Field of Search ........................... 310/90.5, 90, 66, 310/166, 68 R

(56) References Cited

U.S. PATENT DOCUMENTS 5,093,754 A * 3/1992 Kawashima ................. 307/104
5,772,564 A * 6/1998 Taniguchi et al. .......... 310/90.5
6,215,218 B1 * 4/2001 Ueyama ...................... 310/90.5
6,404,088 B1 * 6/2002 Barada et al. ............. 310/68 R

FOREIGN PATENT DOCUMENTS

JP   7-52397     11/1995
JP   10-122182   5/1998

* cited by examiner

Primary Examiner—Dang Le
(74) Attorney, Agent, or Firm—Smith, Gambrell & Russell, LLP

(57) ABSTRACT

A rolling element in a stationary state as surrounded by magnetic bearings is moved until it abuts against a protective bearing, and thereby a mean value of movement spans S is determined. A machine type is determined based on a fact that the mean value of movement spans varies depending upon the types of machine bodies, and then the setting of control parameters is made. In this manner, a control unit of the magnetic bearing is adapted for multiple types of machine bodies.

3 Claims, 8 Drawing Sheets

CONTROLLABLE MAGNETIC BEARING APPARATUS AND METHOD FOR DETERMINING A MACHINE TYPE OF A MAGNETIC BEARING

TECHNICAL FIELD

The present invention relates to a controllable magnetic bearing apparatus and a method for determining a machine type of a magnetic bearing.

BACKGROUND ART

The controllable magnetic bearing apparatus consists of a machine body including a rolling element and magnetic bearings, and a control unit for controlling the machine body. There are plural types of machine bodies so that control parameters vary depending upon the machine types. Accordingly, there has been a need for providing each control unit in correspondence to each type of machine body.

In order to provide each control unit in correspondence to each type of machine body, multiple types of control units must be fabricated on a small-lot basis. This not only imposes inconvenience but also makes it impossible to reduce costs through mass production.

In view of the foregoing, the present invention has an object to provide a controllable magnetic bearing apparatus having a control unit applicable to multiple types of machine bodies. It is another object of the present invention to provide a method for determining a machine type to apply the control unit to any of the multiple types of machine bodies.

DISCLOSURE OF THE INVENTION

In accordance with the present invention, a controllable magnetic bearing apparatus sensing a position of a rolling element supported by a magnetic bearing and controlling the position thereof, the apparatus comprises: means for moving the rolling element in a stationary state in a predetermined direction to determine an amount of movement thereof to a movement limit; and means for determining a machine type of the magnetic bearing based on the amount of movement and setting control parameters (Claim 1).

In the controllable magnetic bearing apparatus thus arranged, the amount of movement of the rolling element is determined by moving the rolling element in a stationary state to the movement limit. The machine type is determined based on a fact that the amount of movement varies depending upon the machine types and then, the setting of control parameters is made. Accordingly, a common control unit can be applied to the multiple types of machine bodies.

In accordance with the present invention, a controllable magnetic bearing apparatus sensing a position of a rolling element supported by a magnetic bearing and controlling the position thereof, the apparatus comprises: means for moving the rolling element in a stationary state in plural directions to determine respective amounts of movement of the rolling element to respective movement limits; means for determining a mean amount of movement based on the amounts of movement; and means for determining a machine type of the magnetic bearing based on the mean amount of movement and setting control parameters (Claim 2).

In the controllable magnetic bearing apparatus thus arranged, determined is the mean amount of movement of the rolling element when the rolling element in a stationary state is moved to the movement limits in the plural directions. Subsequently, the machine type is determined based on a fact that the mean amount of movement varies with each machine type, so as to set the control parameters. Accordingly, a common control unit can be applied to multiple types of machine bodies. In addition, the determination of the machine type is highly reliable because the determination is based on the mean amount of movement.

In accordance with the present invention, a method for determining a machine type of a magnetic bearing comprises: the steps of moving a rolling element supported by a magnetic bearing from a rest position to place on one side of a first radial axis for determining an amount of movement thereof to a movement limit; then moving the rolling element to place on one side of a second radial axis for determining an amount of movement thereof to a movement limit; then moving the rolling element to place on the other side of the first radial axis for determining an amount of movement thereof to a movement limit; then moving the rolling element to place on the other side of the second radial axis for determining an amount of movement thereof to a movement limit; operating a mean amount of movement based on the amounts of movement; and determining a machine type of the magnetic bearing based on the mean amount of movement and setting control parameters (Claim 3).

In the method for determining the machine type of the magnetic bearing, the mean amount of movement is found from the amounts of movement of the rolling element, which, initially being in a stationary state, is sequentially moved to each of the movement limits in each of the different directions. The machine type is determined based on the fact that the mean amount of movement varies with each machine type. Then, the setting of control parameters is made. Accordingly, a common control unit can be applied to multiple types of machine bodies. The determination of the machine types is highly reliable because the determination is based on the mean amount of movement.

BEST MODES FOR CARRYING OUT THE INVENTION

Figure 9:
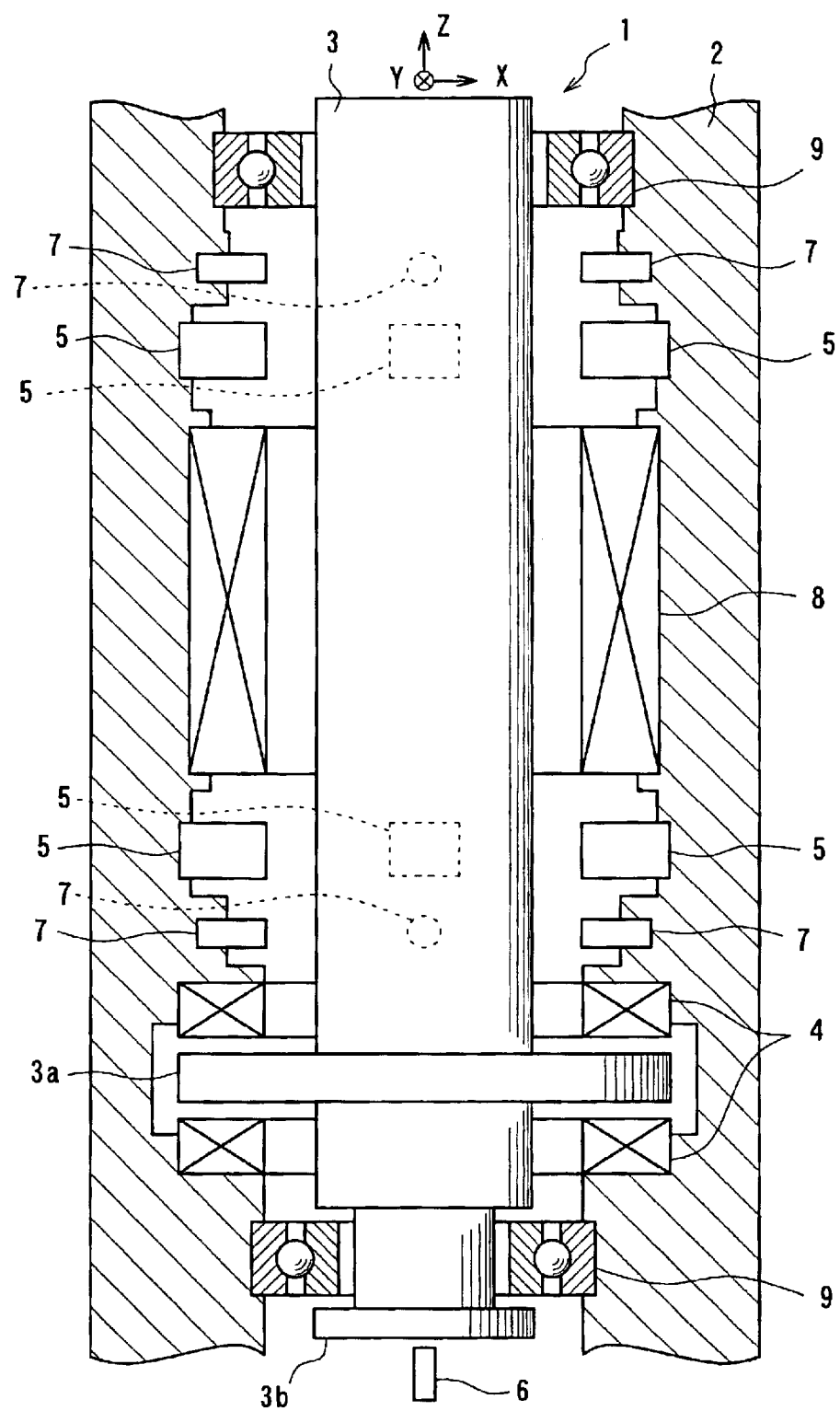
FIG. 9 is a vertical sectional view showing a machine body of the controllable magnetic bearing apparatus.
Figure 10:
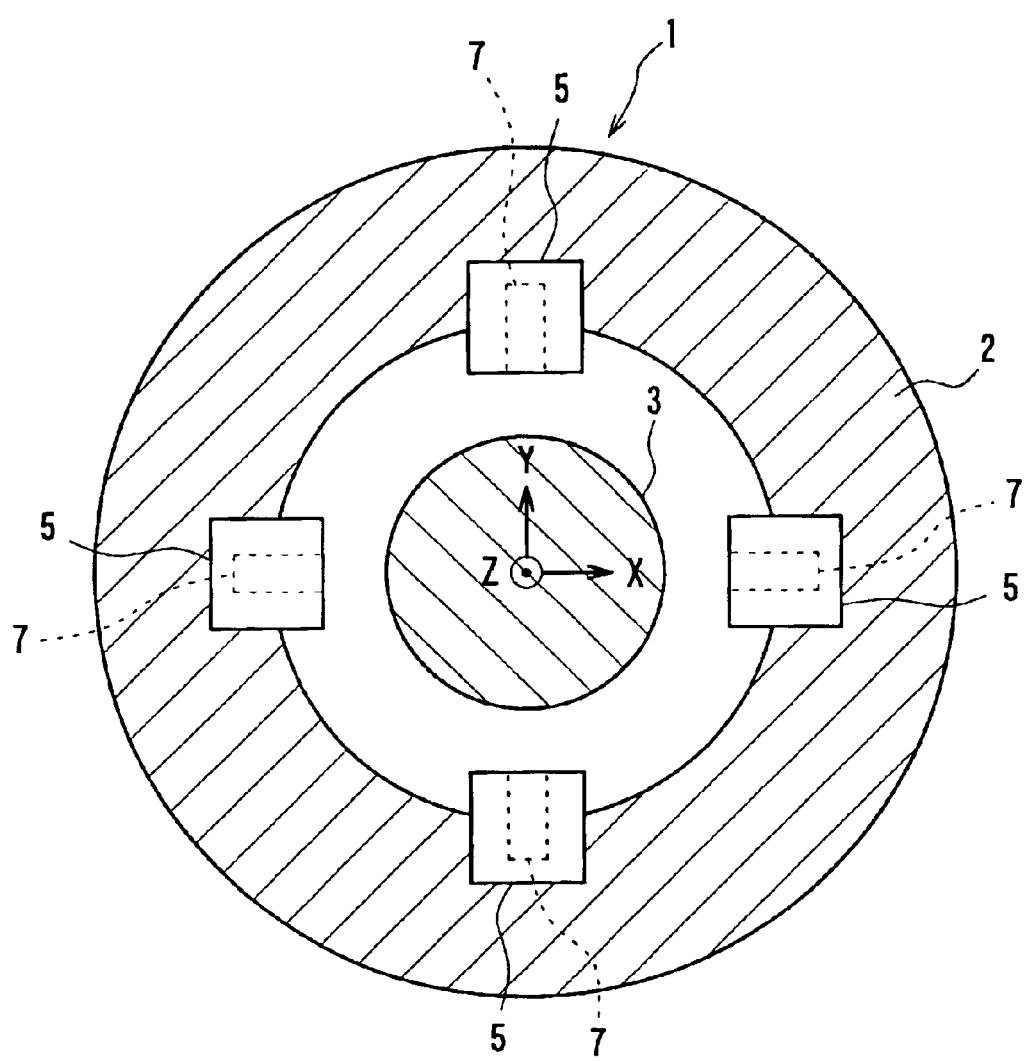
FIG. 10 is a horizontal sectional view showing the above machine body.

FIG. 9 is a vertical sectional view showing a machine body 1 of a controllable magnetic bearing apparatus according to one embodiment of the present invention, and FIG. 10 is a horizontal sectional view thereof.

The machine body 1 is of a vertical construction wherein a rolling element 3 in the form of a vertical shaft rotates within a cylindrical casing 2. In the following description, an axial direction of the rolling element 3 is defined as Z direction and respective directions orthogonal to the Z direction, as seen in the figure, are defined as X direction and Y direction.

Besides the casing 2 and rolling element 3, the machine body 1 further includes an axial magnetic bearing 4, a radial magnetic bearing 5, an axial displacement sensor 6, a radial displacement sensor 7, a motor 8, and a protective bearing 9.

The axial magnetic bearings 4 are disposed above and below a flanged portion 3a of the rolling element 3 as sandwiching the flanged portion therebetween, thereby axially supporting the rolling element 3 in a noncontact fashion. The radial magnetic bearings 5 are disposed at two places on Z-axis thus forming two groups, each of which consists of four radial magnetic bearings equally spaced by 90° around the rolling element 3. The radial displacement sensors 7 are disposed at the same circumferential positions as the radial magnetic bearings 5 in close adjacency thereto along the Z direction, thus forming two groups of four. The axial displacement sensor 6 is disposed opposite to an axial end portion 3b of the rolling element 3. The motor 8 is mounted to an inside wall of the casing 2 for rotating the rolling element 3 at high speeds. The protective bearings 9 are arranged in paired relation for limiting movable ranges of the rolling element 3 with respect to the axial and radial directions, as well as for providing contact support for the rolling element 3 in case the magnetic noncontact support for the rolling element 3 may be disabled. A radial clearance and an axial clearance between the protective bearing 9 and the rolling element 3 are of given values determined according to the type of the machine body 1.

Figure 11:
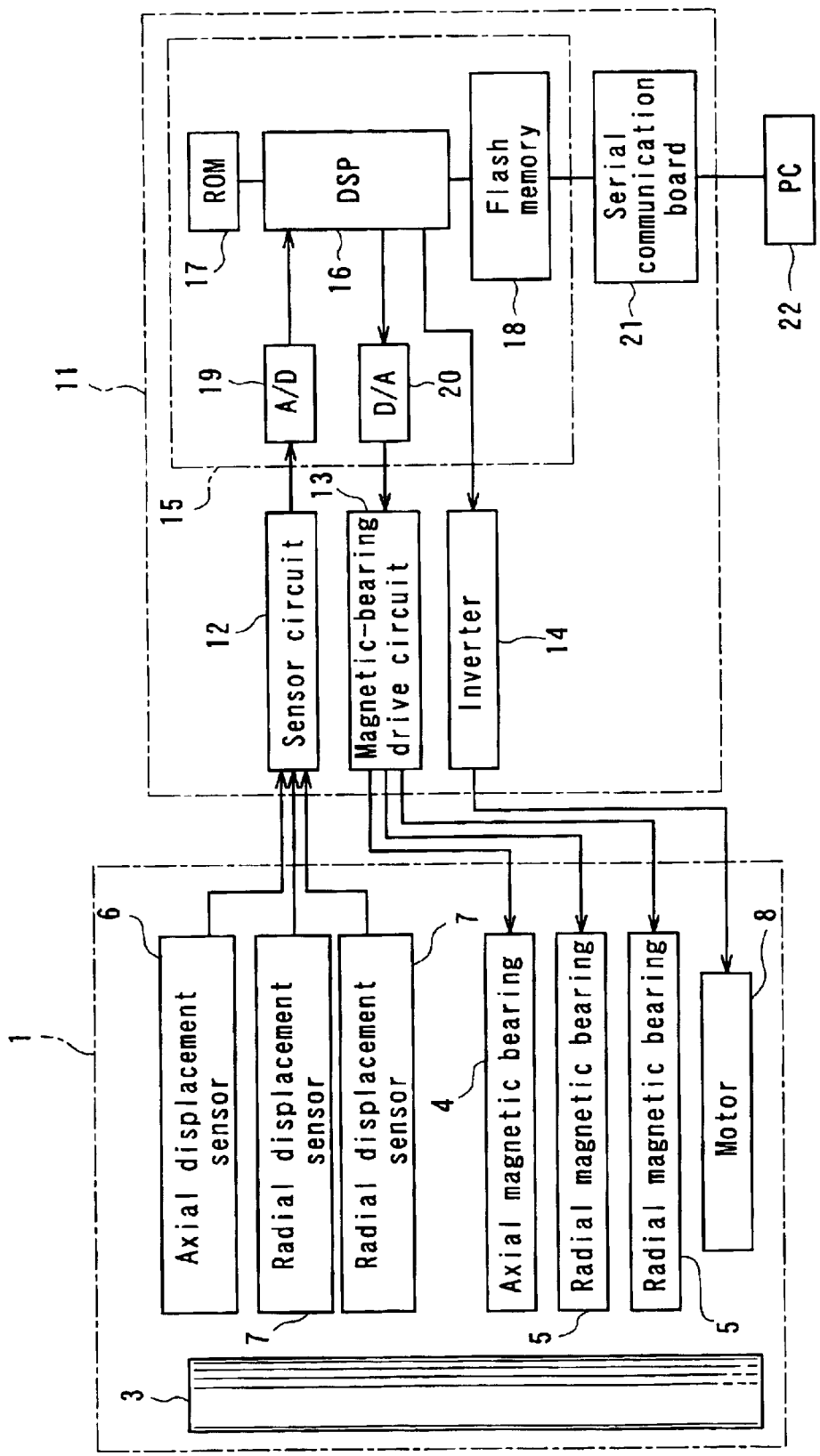
FIG. 11 is a block circuit diagram of the above controllable magnetic bearing apparatus.

FIG. 11 is a block circuit diagram showing connection between the machine body 1 of the above arrangement and a control unit 11 forming, in combination with the machine body, the controllable magnetic bearing apparatus.

The control unit 11 includes a sensor circuit 12, a magnetic-bearing drive circuit 13, an inverter 14, a DSP board 15 and a serial communication board 21. The DSP board 15 is provided with a DSP 16 as a digital signal processor, a ROM 17 connected thereto, a flash memory 18 as a nonvolatile storage device, an A/D converter 19 and a D/A converter 20.

A personal computer 22 disposed at place remote from the control unit 11 is connected to the serial communications board 21 of the control unit 11.

Output signals from the axial displacement sensor 6 and radial displacement sensors 7 are inputted to the DSP 16 via the sensor circuit 12 and A/D converter 19. On the other hand, the DSP 16 provides control of the axial magnetic bearings 4 and radial magnetic bearings 5 via the D/A converter 20 and magnetic-bearing drive circuit 13, thereby allowing the rolling element 3 to be supported in the noncontact fashion as controlling the position of the rolling element 3. The DSP 16 also controls the rotation of the motor 8 via the inverter 14.

The ROM 17 stores a processing program and the like to be performed in the DSP 16. The flash memory 18 stores data which include plural sets of control parameters corresponding to the plural types of machine bodies 1, mean movement spans S (to be described hereinlater in detail) corresponding to the plural types of machine bodies 1, a bias current value Io to be described hereinlater and the like. These data items can be rewritten through the personal computer 22.

Figure 12:
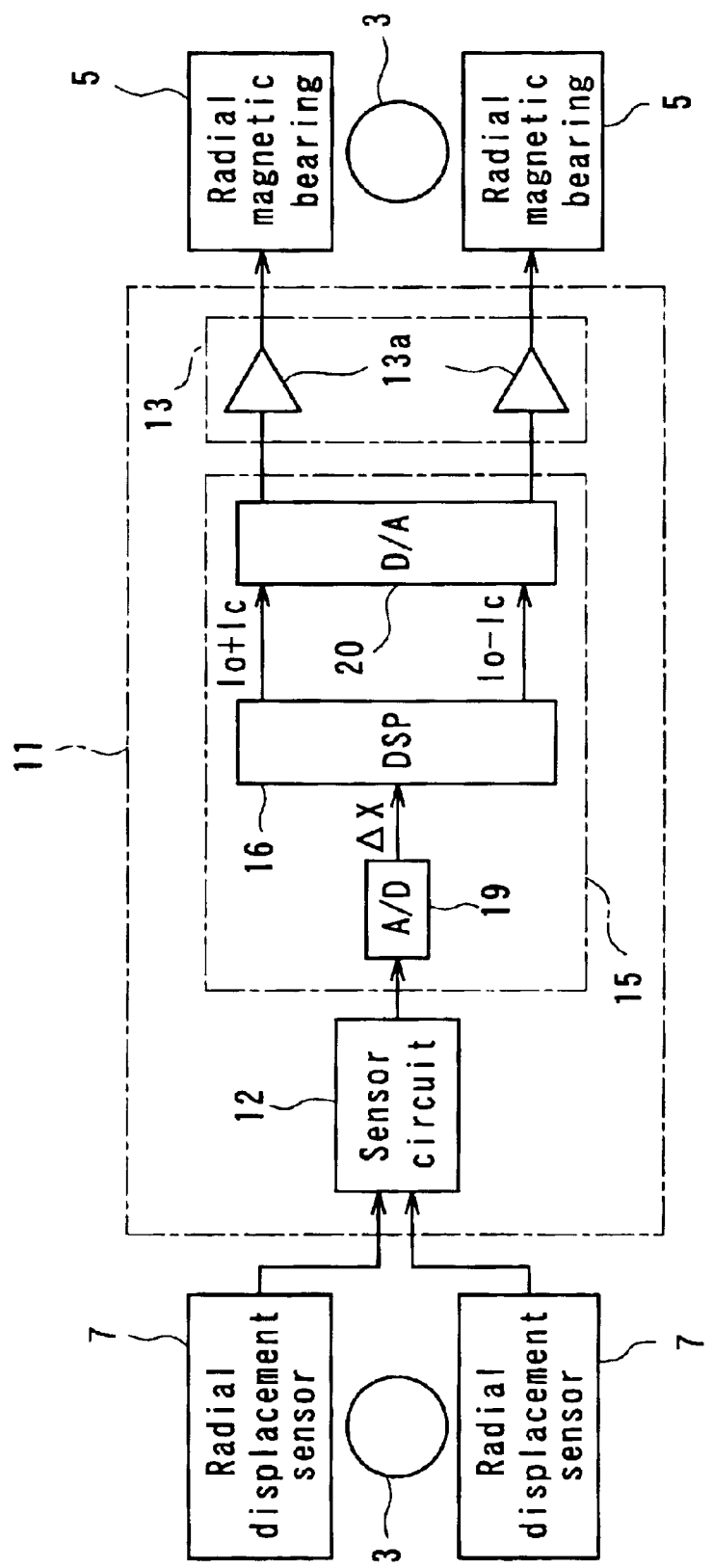
FIG. 12 is a block diagram showing only a portion of the arrangement of the controllable magnetic bearing apparatus that is involved in the control of radial position.

FIG. 12 is a block diagram showing only a portion of the arrangement of the control unit 11 that is involved in the control of radial position. It is assumed that the pair of radial displacement sensors 7 shown in the figure are, for example, disposed opposite to each other across the rolling element 3 along X-axis. The outputs from these radial displacement sensors 7 are inputted to the sensor circuit 12 in which a processing is performed to subtract one of the outputs from the other. An output from the sensor circuit 12 is A/D converted for giving a displacement signal ΔX. The signal indicates a displacement of the rolling element 3 from a target position with respect to X-axis. The DSP 16 outputs two exciting current signals (Io+Ic) and (Io−Ic) based on the displacement signal ΔX. Io means herein a bias current value, and Ic means a control current value depending upon the sign and magnitude of ΔX. The exciting current signals (Io+Ic) and (Io−Ic) are each D/A converted and then amplified by an amplifier 13a in the magnetic-bearing drive circuit 13. The amplified signals are supplied to the pair of radial magnetic bearings 5 opposing each other across the rolling element 3 along X-axis. According to the displacement signal ΔX, adjustment is made to the electromagnetic force with respect to a direction in which the displacement is reduced to 0. As a result, the rolling element 3 is supported at the X-axis target position.

A similar positional control is performed on Y-axis.

Figure 13:
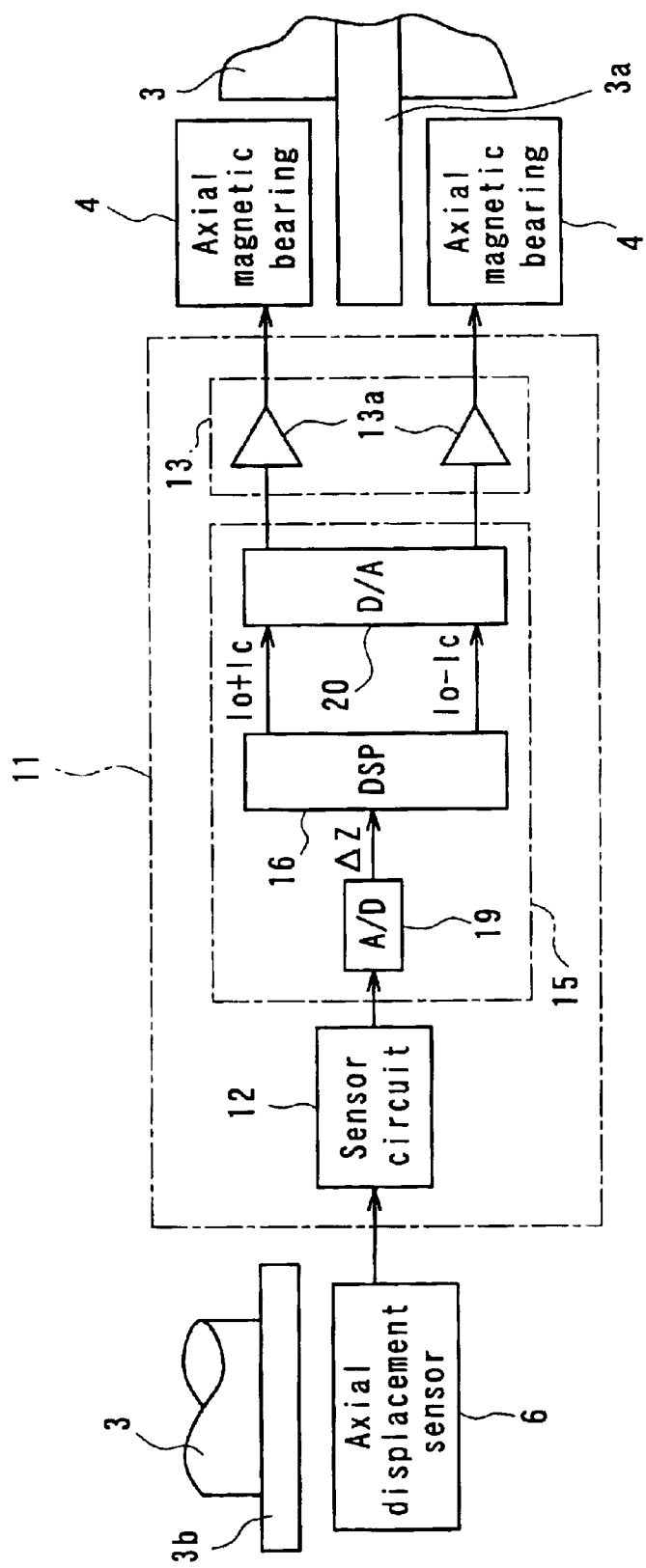
FIG. 13 is a block diagram showing only a portion of the arrangement of the controllable magnetic bearing apparatus that is involved in the control of axial position.

FIG. 13 is a block diagram showing only a portion of the arrangement of the control unit 11 that is involved in the control of axial position. An output from the axial displacement sensor 6 is inputted to the sensor circuit 12. Based on the output signal from the axial displacement sensor 6, the sensor circuit 12 determines a displacement of the rolling element 3 with respect to a Z-axis target position. This displacement is A/D converted to a displacement signal ΔZ which is inputted to the DSP 16. The DSP 16 outputs two exciting current signals (Io+Ic) and (Io−Ic) based on the displacement signal ΔZ. Io means herein a bias current value, and Ic means a control current value depending upon the sign and magnitude of ΔZ. The exciting current signals (Io+Ic) and (Io−Ic) are each D/A converted and then amplified by the amplifier 13a in the magnetic-bearing drive circuit 13. The amplified signals are supplied to the axial magnetic bearings 4 disposed above and below the flanged portion 3a of the rolling element 3. Based on the displacement signal ΔZ, adjustment is made to the electromagnetic force with respect to a direction in which the displacement is reduced to 0. As a result, the rolling element 3 is supported at the Z-axis target position.

The controllable magnetic bearing apparatus of the above arrangement constitutes means for performing the rotation control and the positional control of the rolling element 3. Furthermore, the controllable magnetic bearing apparatus also constitutes: means which, at the start of operation, uses a positional control function centralized on the DSP 16 to move the rolling element 3 in a stationary state in a predetermined direction for determining an amount of movement thereof to a movement limit; and means which determines the machine type of magnetic bearing (machine body 1) based on the determined amount of movement for setting control parameters. An operation for determining the machine type will hereinbelow be described in detail.

Figure 1:
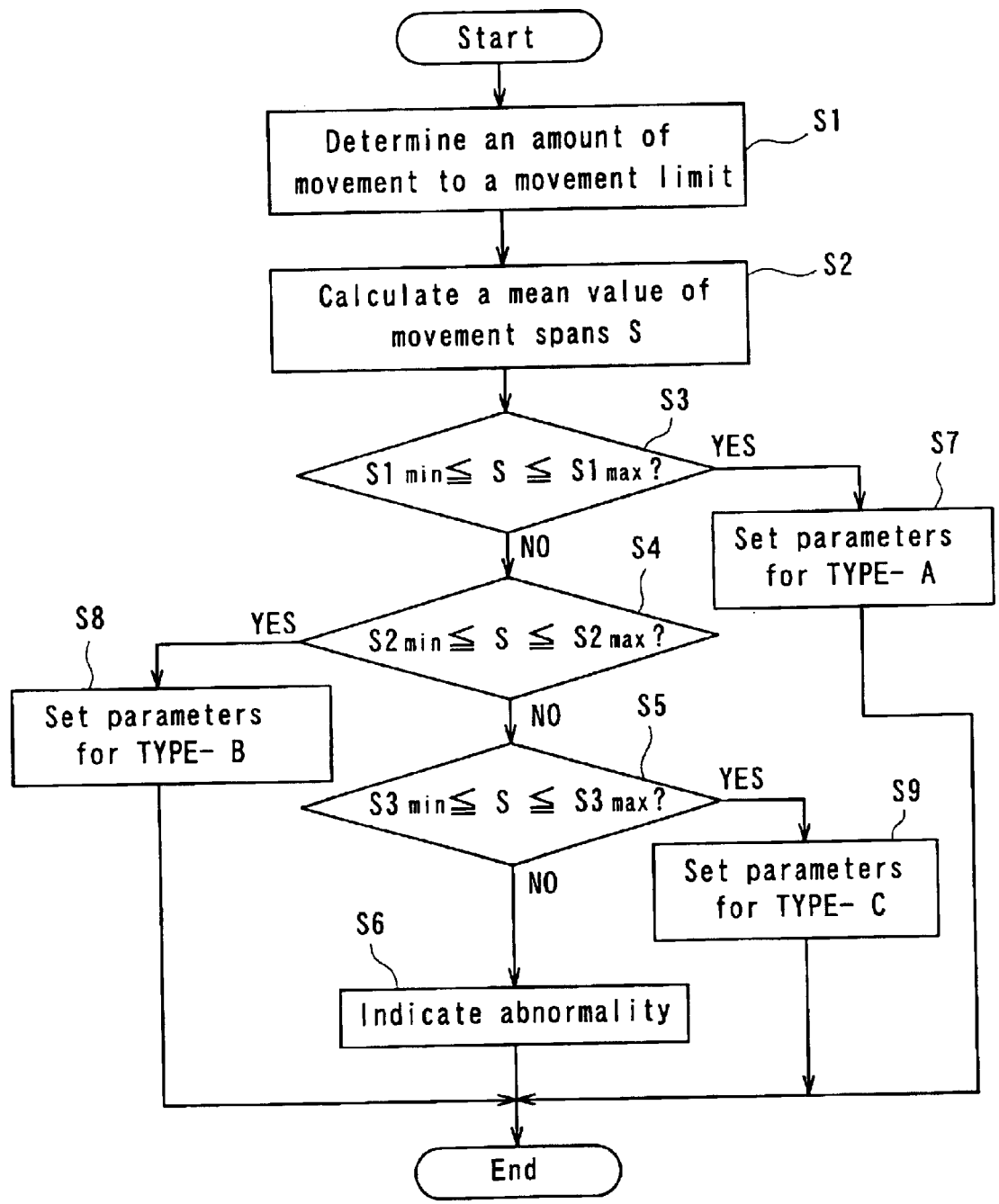
FIG. 1 is a flow chart showing a method of machine type determination taken by a controllable magnetic bearing apparatus according to one embodiment of the present invention.

In the above controllable magnetic bearing apparatus, the axial magnetic bearing 4, radial magnetic bearing 5 and motor 8 are not driven when the control unit 11 is not powered up. Therefore, the rolling element 3 is at rest as supported by the protective bearings 9 in contact fashion. Upon power-up of the control unit 11, the DSP 16 identifies the machine body 1 according to a flow chart of FIG. 1. The embodiment assumes that there are three types of machine bodies 1 which include Type-A, Type-B and Type-C. The length of the clearance between the rolling element 3 and the protective bearing 9 varies with each machine type.

First in Step S1, the DSP 16 takes measurement of the amount of movement to the movement limit. Specifically, the DSP reads provisional control parameters from the flash memory 18 to drive the axial magnetic bearings 4. This allows the rolling element 3 to be magnetically levitated to a provisional target position on Z-axis. In this state, the rolling element 3 is allowed to move in the radial direction within the range defined by the inside-diameter circle of the protective bearing 9.

Figure 2:
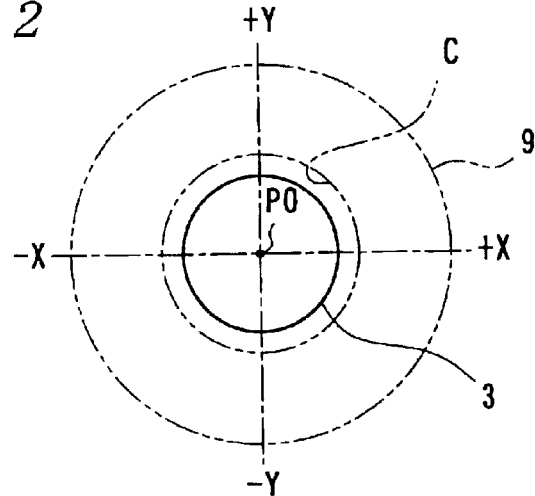
FIG. 2 is a plan view showing the positional relationship between an inside-diameter circle of a protective bearing and a rolling element movable in a range inscribed by the circle.
Figure 3:
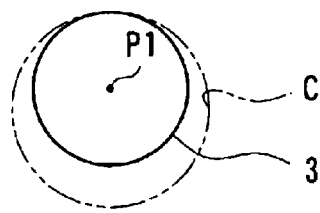
FIG. 3 is a diagram showing the rolling element of FIG. 2 internally touching a +Y side of the inside-diameter circle.
Figure 4:
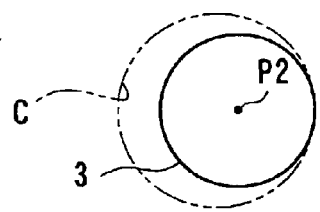
FIG. 4 is a diagram showing the rolling element of FIG. 2 internally touching a +X side of the inside-diameter circle.
Figure 5:
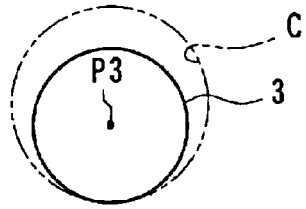
FIG. 5 is a diagram showing the rolling element of FIG. 2 internally touching a −Y side of the inside-diameter circle.
Figure 6:
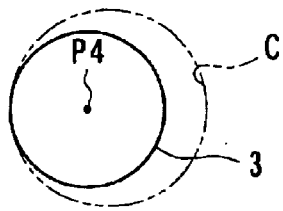
FIG. 6 is a diagram showing the rolling element of FIG. 2 internally touching a −X side of the inside-diameter circle.

FIG. 2 to FIG. 6 are diagrams illustrating in plan the positional relationship between an inside-diameter circle C of the protective bearing 9 and the rolling element 3 movable within an inscribed range of the circle. First assume as an initial state that the rolling element 3 is positioned concentrically with the inside-diameter circle C, as shown in FIG. 2. In this state, the DSP 16 stores a displacement signal ΔY0(=0) based on outputs from the radial displacement sensors 7 disposed in the +Y and −Y directions. Subsequently, the DSP 16 supplies a predetermined exciting current only to the radial magnetic bearing 5 in the +Y direction to thereby attract the rolling element 3 in the +Y direction. This brings the rolling element 3 into internal contact with the +Y side of the protective bearing 9 (the inside-diameter circle C) (a state of FIG. 3). In this state, the DSP 16 reads a displacement signal ΔY1 based on outputs from the radial displacement sensors 7 disposed in the +Y and −Y directions. The DSP 16 calculates a difference (ΔY1−ΔY0) between the displacement signal ΔY1 and the previously stored displacement signal ΔY0. Additionally, the DSP 16 determines an amount YLp (of positive sign) of movement of the rolling element 3 moved in the +Y direction from the position of FIG. 2 to that of FIG. 3 using a previously inputted corresponding relationship between the displacement signal and the actual displacement, and then stores the amount of movement thus determined. Furthermore, the DSP 16 stores a displacement signal ΔX0 (=0) based on outputs from the radial displacement sensors 7 disposed in the +X and −X directions.

Next, the DSP 16 supplies a predetermined exciting current only to the radial magnetic bearing 5 in the +X direction to thereby attract the rolling element 3 in the +X direction. This brings the rolling element 3 into internal contact with the +X side of the protective bearing 9 (the inside-diameter circle C) (a state of FIG. 4). In this state, the DSP 16 reads a displacement signal ΔX1 based on outputs from the radial displacement sensors 7 disposed in the +X and −X directions. The DSP 16 calculates a difference (ΔX1−ΔX0) between the displacement signal ΔX1 and the previously stored displacement signal ΔX0. Based on the calculation result, the DSP 16 determines an amount XLp (of positive sign) of movement of the rolling element 3 moved in the +X direction from the position of FIG. 3 to that of FIG. 4, then storing the amount of movement thus determined.

Next, the DSP 16 supplies a predetermined exciting current only to the radial magnetic bearing 5 in the −Y direction to thereby attract the rolling element 3 in the −Y direction. This brings the rolling element 3 into internal contact with the −Y side of the protective bearing 9 (the inside-diameter circle C) (a state of FIG. 5). In this state, the DSP 16 reads a displacement signal ΔY2 based on outputs from the radial displacement sensors 7 disposed in the +Y and −Y directions. The DSP 16 calculates a difference (ΔY2−ΔY0) between the displacement signal ΔY2 and the previously stored displacement signal ΔY0. Based on the calculation result, the DSP 16 determines an amount YLn (of negative sign) of movement of the rolling element 3 moved in the −Y direction from the position of FIG. 2 to that of FIG. 5, then storing the amount of movement thus determined.

Next, the DSP 16 supplies a predetermined exciting current only to the radial magnetic bearing 5 in the −X direction to thereby attract the rolling element 3 in the −X direction. This brings the rolling element 3 into internal contact with the −X side of the protective bearing 9 (the inside-diameter circle C) (a state of FIG. 6). In this state, the DSP 16 reads a displacement signal ΔX2 based on outputs from the radial displacement sensors 7 disposed in the +X and −X directions. The DSP 16 calculates a difference (ΔX2−ΔX0) between the displacement signal ΔX2 and the previously stored displacement signal ΔX0. Based on the calculation result, the DSP 16 determines an amount XLn (of negative sign) of movement of the rolling element 3 moved in the −X direction from the position of FIG. 3 to that of FIG. 6, then storing the amount of movement thus determined.

Figure 7:
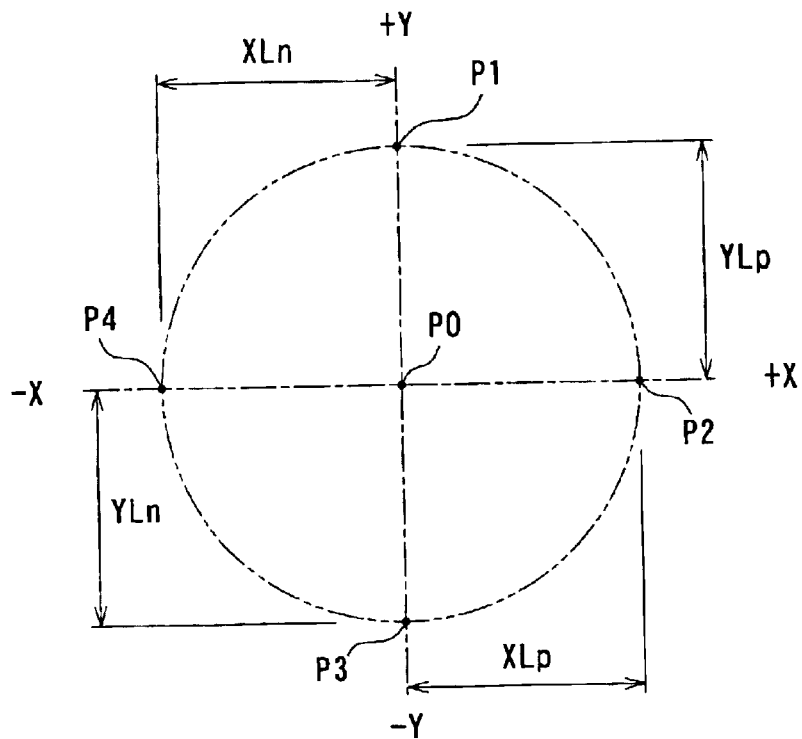
FIG. 7 is a diagram showing each position of the center of and each amount of movement of the rolling element when the rolling element is sequentially moved to each of movement limits thereof.

FIG. 7 is a plot of positions P0, P1, P2, P3 and P4 of the center of the rolling element 3 moved from the state of FIG. 2 in the aforementioned manner or in the order of FIG. 3, FIG. 4, FIG. 5 and FIG. 6 as maintained in internal contact with the protective bearing 9. It is noted that the aforementioned amounts of movement YLp, XLp, YLn, and XLn are such lengths as shown in FIG. 7.

Figure 8:
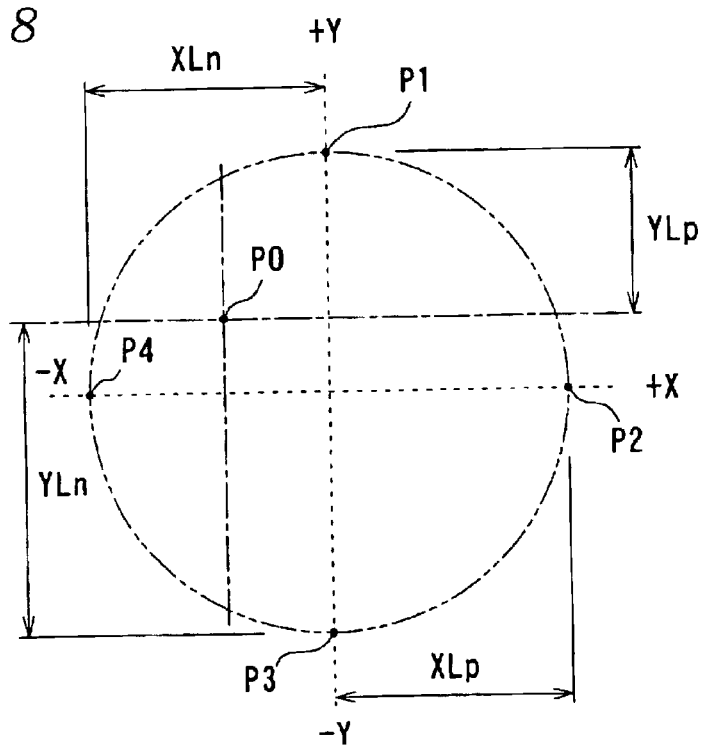
FIG. 8 is a diagram showing each position of the center of and each amount of movement of the rolling element when the rolling element is sequentially moved to each of movement limits thereof, in a case where an initial position of the center of the rolling element is out of the origin of the X-Y coordinates.

It is noted that the initial position P0 of the center of the rolling element 3 is not always at the center of P1 to P4, as shown in FIG. 8. In this case, YLp and YLn are not equal to each other because they are read with reference to the displacement signal ΔY0 with respect to P0. Even in this case, however, the center of the rolling element 3 is moved to the position of P1 when the rolling element 3 is attracted by the radial magnetic bearing 5 in the +Y direction. Accordingly, the amounts of movement, XLp and XLn are the same as in the case shown in FIG. 7.

Based on the amounts of movement, YLp, XLp, YLn and XLn thus determined, the DSP 16 calculates a mean value of movement span S (Step S2). Specifically, movement spans Ys and Xs in the Y and X directions are first determined using:

$$Ys = YLp - YLn$$

$$Xs = XLp - XLn$$

Next, the mean value of movement span S is determined using:

$$S = (Ys + Xs)/2 \tag{1}$$

The reliability of the determination of the machine type (described later) is enhanced by determining the mean value S with respect to both the X and Y directions.

Subsequently, the DSP 16 determines whether or not the mean value of movement span S satisfies:

$$S1\min \leq S \leq S1\max \tag{2}$$

where S1min and S1max denote a minimum value and a maximum value of the radial clearance between the protective bearing 9 and the rolling element 3 in the machine body 1 of Type-A (Step S3). If the machine body 1 is Type-A, the answer to the above expression (2) is YES. Therefore, the DSP 16 proceeds to Step S7 to read in control parameters for Type-A from the flash memory 18 and to set, based on the read control parameters, target values of support for the axial magnetic bearings 4 and the radial magnetic bearings 5.

If the machine body 1 is not Type-A, then the answer to the above expression (2) is NO. Therefore, the DSP 16 proceeds to Step S4 to determine whether or not the mean value of the movement span S satisfies:

$$S2\min \leq S \leq S2\max \tag{3}$$

where S2min and S2max denote a minimum value and a maximum value of the radial clearance between the protective bearing 9 and the rolling element 3 in the machine body 1 of Type-B (provided that S1max<S2min). If the machine body 1 is Type-B, the answer to the above expression (3) is YES. Therefore, the DSP 16 proceeds to Step S8 to read in control parameters for Type-B from the flash memory 18 and to set, based on the control parameters, target values of support for the axial magnetic bearings 4 and the radial magnetic bearings 5.

If the machine body 1 is not Type-B, the answer to the above expression (3) is NO. Therefore, the DSP 16 proceeds to Step S5 to determine whether or not the mean value of the movement span S satisfies:

$$S3\min \leq S \leq S3\max \tag{4}$$

where S3min and S3max denote a minimum value and a maximum value of the radial clearance between the protective bearing 9 and the rolling element 3 in the machine body 1 of Type-C (provided that S2max<S3min). If the machine body 1 is Type-C, the answer to the above expression (4) is YES. Therefore, the DSP 16 proceeds to Step S9 to read in control parameters for Type-C from the flash memory 18 and to set, based on the control parameters, target values of support for the axial magnetic bearings 4 and the radial magnetic bearings 5.

If the machine body 1 is not Type-C, the answer to the above expression (4) is NO. Accordingly, the machine body 1 is not any of Type-A, Type-B and Type-C, so that the determination of machine type cannot be made. Therefore, the DSP 16 proceeds to Step S6 to indicate abnormality.

In this manner, the type of machine body 1 can be determined from the mean value of the movement spans S, and thereby the setting of control parameters for an applicable machine type is automatically made for quickly transferring the rolling element to a magnetically levitated state. Thus, the common control unit 11 makes it possible to automatically set appropriate control parameters for any of the plural types of machine bodies 1 and to control the position of the rolling element 3. This permits the control unit 11 to be applied to general purposes, so that the control unit 11 can be mass-produced for achieving the cost reduction. It is noted that abnormality is indicated only when the automatic determination is impossible and then an operator sets the control parameters based on his determination.

Although the flow chart (FIG. 1) of the foregoing embodiment illustrates the processing for selecting any one of the three types, it is also possible to make determination as to the larger number of machine types for automatic setting of the control parameters.

Although the foregoing embodiment determines the machine type based on the amounts of movement YLp, XLp, YLn and XLn, it is also possible to determine the machine type based on only the amount of movement in the Y direction or X direction.

In the foregoing embodiment, prior to the determination of the amounts of movement YLp, XLp, YLn and XLn, the axial magnetic bearings 4 are excited to effect a provisional state where the rolling element is levitated in the axial direction. However, the rolling element 3 may not be axially levitated if the rolling element 3 can be axially attracted even in a state where the rolling element is in contact with the protective bearings 9.

In the foregoing embodiment, the determination of the machine type is made based on the amount of movement to the movement limit in the radial direction. However, it is also possible to determine the machine type based on the amount of movement to the movement limit in the axial direction. In this case, the rolling element 3 in a stationary state is levitated to bring its axial end portion 3a into abutment against the protective bearing 9 so that an amount of movement may be determined from an amount of variation of the displacement signal ΔZ from the axial displacement sensor 6 and then the machine type is determined based on this amount of movement.

What is claimed is:

1. A controllable magnetic bearing apparatus sensing a position of a rolling element supported by a magnetic bearing and controlling the position thereof, the apparatus comprising:

means for moving said rolling element in a stationary state in a predetermined direction to determine an amount of movement thereof to a movement limit; and means for determining a machine type of the magnetic bearing based on said amount of movement and setting control parameters.

2. A controllable magnetic bearing apparatus sensing a position of a rolling element supported by a magnetic bearing and controlling the position thereof, the apparatus comprising:

means for moving said rolling element in a stationary state in plural directions to determine respective amounts of movement thereof to respective movement limits;

means for determining a mean amount of movement based on said amounts of movement; and means for determining a machine type of the magnetic bearing based on the mean amount of movement and setting control parameters.

3. A method for determining a machine type of a magnetic bearing comprising the steps of:

moving a rolling element supported by a magnetic bearing from a rest position to place on one side of a first radial axis and determining an amount of movement thereof to a movement limit;

then moving said rolling element to place on one side of a second radial axis and determining an amount of movement thereof to a movement limit;

then moving said rolling element to place on the other side of the first radial axis and determining an amount of movement thereof to a movement limit;

then moving said rolling element to place on the other side of the second radial axis and determining an amount of movement thereof to a movement limit;

operating a mean amount of movement based on said amounts of movement; and determining a machine type of the magnetic bearing based on said mean amount of movement and setting control parameters.

* * * * *